April 7, 1953 R. H. DREISBACH 2,634,336

DUAL STYLUS PHONOGRAPH PICKUP

Filed Feb. 9, 1949

INVENTOR.
Robert H. Dreisbach
BY
Clarence J. Loftus
Atty.

Patented Apr. 7, 1953

2,634,336

UNITED STATES PATENT OFFICE 2,634,336

DUAL STYLUS PHONOGRAPH PICKUP

Robert H. Dreisbach, Fort Wayne, Ind., assignor to The Magnavox Company, Fort Wayne, Ind., a corporation of Delaware Application February 9, 1949, Serial No. 75,319

7 Claims. (Cl. 179—100.41)

This invention relates to phonographs and particularly to a form of tone arm and pickup cartridge suited to use with either standard groove or microgroove records, yet capable of high fidelity reproduction with either type.

In the development of high fidelity pickups it has been a major problem to provide acceptable qualities of sensitivity, broad frequency response and good tracking characteristics, yet at the same time to be of sufficiently sturdy and rugged nature as to be adapted for use in home phonographs and automatic record changers. The provision of a pickup having acceptable characteristics for the reproduction of long playing microgroove records has presented an equally difficult problem. Consequently, so far as known, it has heretofore been regarded as entirely impossible to produce a pickup capable of interchangeably playing either type of record, yet having the operating characteristics required to give high fidelity reproduction with both types.

This is not primarily due to the fact that the stylus tip or point required for the microgroove records is smaller than the standard point but arises from other causes as well. For one thing, the microgroove records are recorded with less level than standard records (approximately 4.5 db down) so that in any previously known form of pickup the voltage output of the cartridge is so different with the different types of records that the same cartridge cannot be used for both. The requirements for faithful tracking also differ between the two types of records, as does the amount of lateral and vertical compliance required.

It has accordingly been the practice in phonographs designed to use long playing records as well as the standard variety to provide a pair of separate tone arms; each with its own pickup cartridge designed specifically for one type of record only. But this also falls short of being a really satisfactory answer to the problem of producing a commercially acceptable machine capable of handling either type record. First, it requires a separate, additional tone arm, pivotal mounting, pickup cartridge, and stylus, which necessarily increases manufacturing costs considerably, even if no form of automatic record changer is employed. In an automatic record changer the additional costs and mechanical complications involved in attempting to equip two separate, independent and different arms with devices to synchronize their motion with the operation of a record changer is obviously so prohibitive that it has not been attempted commercially. In fact, the manufacturers who have adapted their record changers to two arm operation have merely provided an auxiliary arm having no automatic control means. Thus the automatic changer is useful only with standard records, and the microgroove records may be played only manually, one at a time.

By the teachings of the present invention this is unnecessary, however, and it is entirely practicable to play either standard or microgroove records by a single tone arm utilizing only one pickup cartridge. Moreover, this single arm may be used with any conventional type of record changer, so that either type record may be successfully handled by the changer. The structure here disclosed thus not only makes it possible to play either type of record on any conventional automatic changer, but provides means for equalizing the voltage output from the cartridge when using the different types of records, and compensates for the variations in requirements of tracking and compliance. The principles of this disclosure are believed to be equally applicable to pickups of any type having an electromagnetic converter by which the mechanical vibrations of a stylus tip are converted into electrical energy, but it is particularly well suited to employment in connection with a crystal pickup and will accordingly be described in connection with a pickup cartridge of that type.

It is believed obvious that the provision of an acceptable high fidelity pickup requires the simultaneous solution of several different mechanical and electrical problems; that is, it must have the requisite characteristics of high sensitivity, proper damping, freedom from self-resonance, adequate lateral and vertical compliance, and, of course, ample physical strength to withstand rough use. In addition, it must be suited to operation under force of only a few grams, free of unwanted "needle talk," and capable of faithful tracking without perceptible wear on the record or stylus tip; yet at the same time be capable of good high frequency response. While these and other characteristics have long been known to be individually desirable in themselves, yet they have invariably been found to be more or less irreconcilable with each other; to the extent that the design of a suitable high fidelity pickup for even a single type of record has been recognized as being an extremely difficult and technical undertaking. The problem is obviously further complicated by the requirement that the pickup be suitable for either of two separate and somewhat different types of record grooves. The heretofore conflicting mechanical requirements needed to effect accomplishment of all of the desired qualities of a dual pickup cartridge are reconciled by the teachings of the present invention, as will appear.

Broadly, the illustrated form of the invention employs a tone arm having a crystal pickup cartridge with a single stylus holder having a stylus shank arranged to form two arms of different degrees of stiffness; one arm having a standard stylus point and the other having a point suited to the microgroove records. The cartridge is pivotally mounted in the end of the tone arm and is provided with a manual spring latch whereby it may be tilted between two different positions to bring either one of the stylus tips into engagement with the surface of the record.

As shown, the two arms of the stylus shank are oppositely oriented and the different tips are brought down against the record by tilting the cartridge forwardly or backwardly, though the same result may be accomplished by rotating the cartridge on its vertical axis or by arranging the stylus shanks in other positions and tilting the cartridge accordingly.

In its more specific aspects, the invention deals with the peculiar structure, arrangement and construction of the coacting parts whereby the requisite characteristics of proper damping are accomplished without sacrifice of high sensitivity and without causing objectionable self-resonance. Similarly, adequate lateral and vertical compliance are assured without material reduction of sensitivity, and yet by a structure having ample physical strength to withstand rough use and abuse. The vibrating parts are of very small mass so that their low inertia provides good tracking characteristics in the high frequency range and also have a high compliance providing good tracking characteristics in the low frequency range, thus providing good tracking characteristics over the full range with a low needle force.

The invention will be described in connection with the drawings of this specification wherein.

Figures 1, 2, 3:
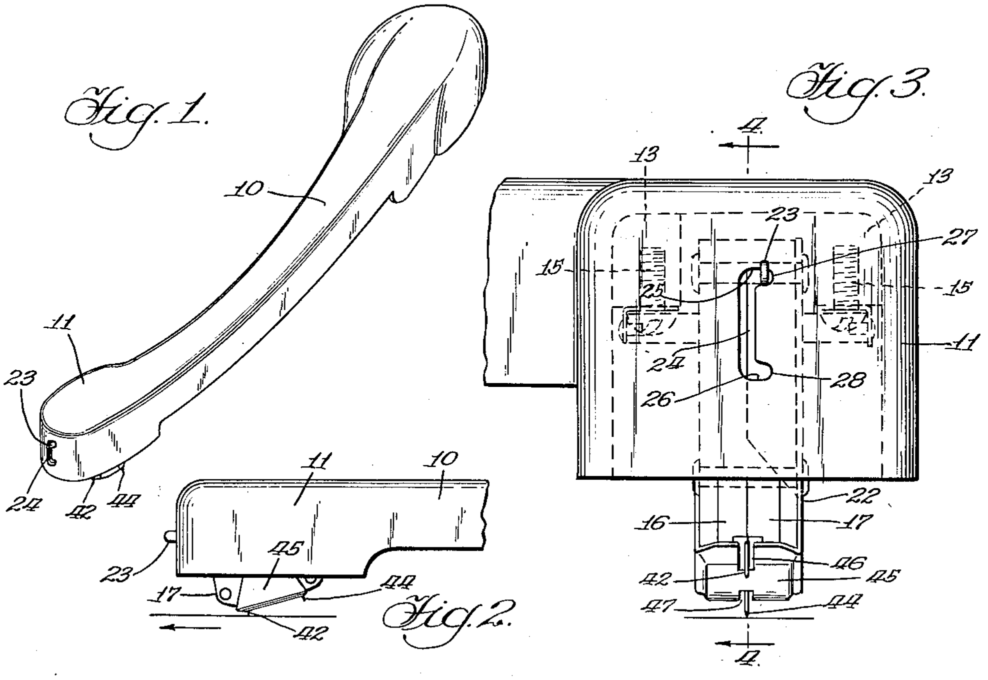
Figure 1 is a perspective view of a tone arm according to these teachings.
Figure 2 is a fragmental side elevation view of the end of the tone arm showing the relative positions of the pickup cartridge and surfaces of the record.
Figure 3 is an enlarged elevational view of the end of the tone arm structure.

The tone arm, generally indicated at 10, includes a head portion 11 in which the pickup cartridge 12 is mounted. As shown, the arm is formed of molded plastic material with a pair of inside shoulders 13 on which metal brackets 14 are secured by screws 15. The cartridge 12 has a housing comprising opposite housing portions 16 and 17, each provided with a flange 18 in which a pair of small pins or trunnions 19 are mounted. These trunnions extend through the perforations in the brackets 14 on each side of the cartridge and provide a pivotal connection between the tone arm and cartridge so that it may be alternately positioned in either of two positions shown in Figures 2 and 4.

The opposite housings 16 and 17 are held together in any conventional manner as by the tubular rivets 21 and in the form of the invention shown two of these rivets are used to attach a bracket 22 on which the spring arm 23 is mounted to extend through the bayonet slot 24 in the extreme end of the tone arm. The spring arm is thus arranged to extend outside of the tone arm and is adapted to move between an upper stop surface 25 and a lower stop 26 to limit the movement of the cartridge in either direction. The slot 24 is preferably provided with detent portions 27 and 28 at its upper and lower ends respectively. Thus the spring arm 23 may snap into either one of these detents, hold itself firmly against the upper or lower stop surfaces and latch the cartridge firmly in position so that it will remain fixed and have no tendency towards looseness or vibration.

The cartridge shown includes a bimorphous piezoelectric crystal of the twister type having its upper end mounted in a channel shaped rubber mounting 31. The lower end of the crystal is mounted on a crystal driving member 32. This member is located on the axis of the crystal, and has a channel into which the lower end of the crystal is seated and held between a pair of opposite flanges 33. The driving member also includes a tubular stem 34 which extends through a rubber ring 35 in the lower wall of the housing. If desired, the stem 34 may include a shoulder portion 36 between the rubber ring and the flanges 33 in which the crystal is held.

The opening 37 through the lower wall of the cartridge housing has its surfaces formed in a generally oval shape so that the rubber ring 35 may be to some extent compressed within the opening to firmly support the tubular stem 34, yet the rubber will not tend to project either upwardly or downwardly from within the opening. The lower end of the tubular stem 34 receives an upwardly extending spring sleeve of the stylus holder 38 which is preferably provided with a key 39 seated in a keyway at the lower end of the stem 34. The stylus holder 38 carries a dual stylus comprising relatively fine metal wires extending from the bottom of the stylus holder 38 in a direction generally normal to the axis of the crystal and having forwardly extending shank portion 41 terminating in a downwardly inclined stylus tip 42 and a rearwardly extending shank portion 43 terminating in a downwardly inclined stylus tip 44. The tip 42 is formed of semi-permanent alloy metal and is shaped to fit the record groove of a standard phonograph record while the tip 44 is formed of a similar metal but shaped to fit the smaller groove of a microgroove (long playing) record.

The stylus shank 43 used with the microgroove records is somewhat shorter than the stylus 41 intended for the standard record. This allows the longer stylus to have the requisite degree of lateral and vertical compliance required for high fidelity tracking with standard records, yet serves to equalize the voltage output of the crystal so that there is no great variation between the output caused by a microgroove record acting on the shorter stylus and that of a standard record acting on the longer one, despite the fact that the former is recorded at a lower level. This is because the shorter and stiffer stylus shank of the stylus 43 is so related to the length and diameter of the stylus 41 as to compensate for the difference in the angular velocity when playing the two types of records. This results in a higher motional impedance on the shorter stylus, but since the microgroove record, because of its lower level, imparts less angular velocity to the stylus than a standard record does, essentially the same stylus force may be used for tracking both kinds of records.

Both of the styli are protected against accidental damage by the relatively rigid shield 45 fixedly secured to the opposite walls of the cartridge housing and provided with forward and rear notches 46 and 47 to clear the stylus tips enough for all necessary movement in vertical or lateral directions, yet spaced sufficiently close to the stylus tips as to prevent them from being flexed enough so that a permanent set is imparted to the metal.

Figure 4:
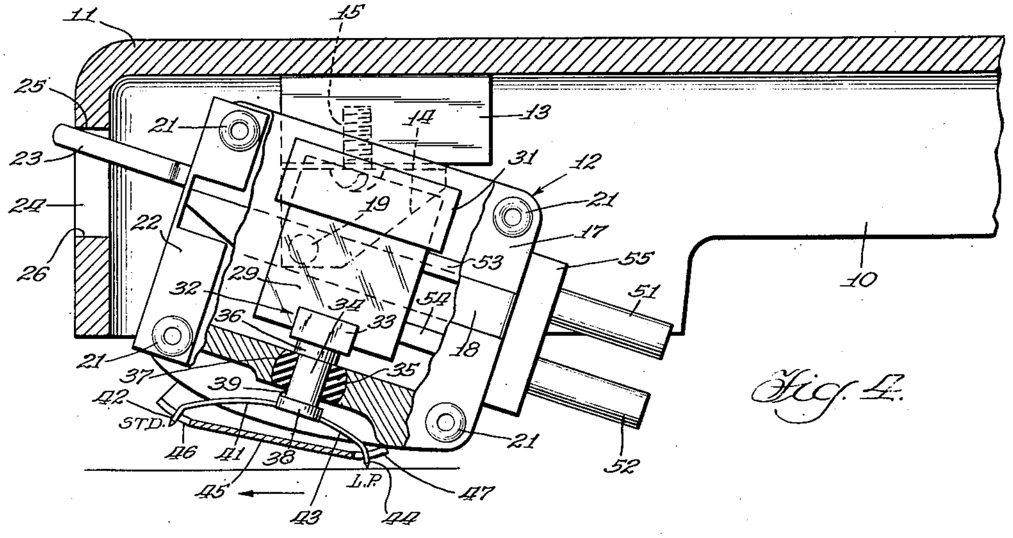
Figure 4 is an enlarged detail sectional view through the tone arm, taken on the plane of line 4—4 in Figure 3 with portions of the pickup cartridge broken away to show the internal structure thereof.

The crystal is connected to a pair of terminal fittings 51 and 52 by the connecting strips 53 and 54, respectively, and these terminal fittings are mounted in an insulating block 55 in the conventional manner so that voltage impulses generated in the pickup may be fed to the amplifiers of the phonograph in the usual way. It is to be noted, however, that the unit holds the tip 42 in a forwardly inclined position in the grooves of the record (Figure 2), yet when the parts are shifted to bring the stylus tip 44 into the record, the inclination of the stylus is reversely oriented so that it rides backwardly in the groove (Figure 4).

From the foregoing it will be seen that the teachings of this disclosure not only permit the alternate utilization of either of two styli in a single pickup cartridge, but also provide means to equalize the output of different types of records recorded at different levels, yet do so without the introduction of any mechanism that reduces the efficiency of the pickup to anything below that attainable with a single stylus. Thus the invention accomplishes a convenient manner of shifting between long playing and standard records without bringing about mechanical complications that would adversely affect the frequency response, tracking characteristics, sensitivity, damping, or other characteristics required for high fidelity reproduction. In addition, the present teachings by eliminating the need for separate tone arms for the two different types of records, make possible for the first time the utilization of a conventional record changer mechanism to handle either standard or microgroove records.

In the specific form of the invention illustrated it is seen that the two alternately engageable stylus tips are so mounted and related to each other that either may drive the crystal by a twisting moment of force exerted directly on the crystal axis, yet the mechanism employed for the purpose is of extremely small mass so that its inertia does not adversely affect the high frequency response of the unit. Moreover, by these teachings the parts may be so constructed that the natural resonant frequency of the styli employed is well above the range of frequencies to be reproduced so that the unit displays no objectionable self-resonant characteristics. The two styli may be conveniently replaced when necessary by merely withdrawing the inner sleeve on which they are mounted and replacing them with a similar unit. The keyway and key in the tubular sleeve of the stylus holder insure against any possibility of improper insertion of the new stylus mounting since when the key is seated in the keyway the parts will necessarily be in their properly oriented positions. It will also be seen that while the stylus is of extremely small mass and capable of adequate compliance, both laterally and vertically, the unit is so designed that the stylus will not be damaged or bent even by rough treatment or abuse, such as dropping the tone arm on the record. This is accomplished by the specific arrangement of the guard and stylus tip so related to each other that the flexing of the stylus is limited to something less than required to distort it.

In short, it is submitted that the teachings of this invention reconcile conflicting considerations for the first time and thus provide a structure capable of both automatic record changing and high fidelity reproduction from either standard or microgroove phonograph records.

Having thus described the invention, what I claim as new and desire to protect by United States Letters Patent is:

1. In a phonograph pickup, in combination, a tone arm; a pickup cartridge carried by said tone arm; a horizontal pivotal mounting for said pickup cartridge; stop devices to limit the movement of said cartridge and establish alternate positions therefor; a single electro-mechanical sound converter within the cartridge, with a single stylus holder extending downwardly of the sound converter to the outside of the cartridge; a stylus member carried by the holder at the outer end thereof and extending in generally opposite directions therefrom and a plurality of stylus tips of different sizes spaced apart from each other on said stylus, together with means selectively to shift the pickup cartridge between its alternate positions to alter the relative projection of the stylus tips from the tone arm whereby either tip may project beyond the other to engage a record surface; and means to hold the cartridge in either alternate position.

2. In a phonograph pickup, in combination, a tone arm; a pickup cartridge carried by said tone arm; a pivotal mounting for said pickup cartridge the axis of which is transverse to the axis of said tone arm; stop devices to limit the movement of said cartridge and establish alternate positions therefor; a single electro-mechanical sound converter within the cartridge, with a single stylus holder extending from the sound converter to the outside of the cartridge; a stylus member carried by the holder at the outer end thereof and extending in generally opposite directions therefrom and a plurality of stylus tips of different sizes spaced apart from each other on said stylus, together with means selectively to shift the pickup cartridge between its alternate positions to alter the relative projection of the stylus tips from the tone arm whereby either tip may project beyond the other to engage a record surface.

3. In a phonograph pickup, in combination, a tone arm; a pickup cartridge carried by said tone arm; a pivotal mounting for said pickup cartridge whereby it may be selectively moved to alternate positions, the axis of said mounting being perpendicular to the axis of said tone arm, a single electro-mechanical sound converter within the cartridge, with a single stylus holder extending from the sound converter means to the outside of the cartridge, and a stylus at the outer end of said stylus holder; said stylus including a plurality of stylus tips of different sizes reversely oriented with respect to each other;

and spaced apart from each other; together with means to shift the pickup cartridge to alter the relative projection of the stylus tips from the tone arm whereby either tip may project beyond the other to engage a record surface.

4. In a phonograph pickup, in combination, a tone arm; a pickup cartridge carried by said tone arm; a shiftable mounting for said pickup cartridge whereby it may be selectively moved to alternate positions, a single electro-mechanical sound converter within the cartridge, with a single stylus holder extending from the sound converter means to the outside of the cartridge, and a stylus at the outer end of said stylus holder; said stylus including a plurality of stylus tips of different sizes spaced apart from each other at different distances from said holder; together with means to shift the pickup cartridge to alter the relative projection of the stylus tips from the tone arm whereby either tip may project beyond the other to engage a record surface.

5. In a phonograph pickup, in combination, a tone arm; a pickup cartridge carried by said tone arm; a shiftable mounting for said pickup cartridge; a single electro-mechanical converter within the cartridge, with a single stylus holder extending from the converter to the outside of the cartridge; a plurality of stylus shanks carried by the holder outside of the cartridge, said stylus shanks extending in different directions from the holder with one of said shanks more compliant than the other, the more compliant shank having a stylus tip of standard tip radius and the other shank having a stylus tip of microgroove tip radius, together with means to alter the relative projection of the stylus tips from the tone arm, whereby either tip may project beyond the other to engage a record surface.

6. In a phonograph pickup, in combination, a tone arm; a pickup cartridge carried by said tone arm; a shiftable mounting for said pickup cartridge; a single electro-mechanical converter within the cartridge, with a single stylus holder extending from the converter to the outside of the cartridge; a relatively long stylus shank and a relatively short stylus shank carried by the holder outside of the cartridge, said stylus shanks extending in different directions from the holder with said relatively long shank more compliant than the other, the relatively long stylus shank having a stylus tip of standard tip radius and the other shank having a stylus tip of microgroove tip radius, together with means to alter the relative projection of the stylus tips from the tone arm, whereby either tip may project beyond the other to engage a record surface.

7. In a phonograph reproducer arm assembly for alternatively reproducing fine-groove and coarser groove laterally modulated disk records, the amplitude of excursion of the coarser groove being at a higher level than that of the fine groove, the combination which comprises a pickup cartridge rotatably mounted in said arm and adapted to engage a record surface, said pickup cartridge comprising a transducer for converting mechanical movement into an electrical signal, a stylus mounting attached to said transducer and having a pair of angularly spaced approximately horizontally disposed cantilever arms of different lateral compliance, a stylus of small tip radius adapted to engage said fine-groove records mounted on the cantilever arm of lower compliance, and a stylus of larger tip radius adapted to engage said coarser groove records mounted on the cantilever arm of higher compliance, whereby differences in the outputs of said transducer and the required tracking forces for fine and coarser groove records may be reduced.

ROBERT H. DREISBACH.

REFERENCES CITED

The following references are of record in the file of this patent:

UNITED STATES PATENTS

| Number | Name | Date |
|---|---|---|
| 1,526,474 | Grady | Feb. 17, 1925 |
| 1,558,393 | Pringle | Oct. 20, 1925 |
| 1,570,297 | Dyer | Jan. 19, 1926 |
| 1,744,047 | Keller | Jan. 21, 1930 |
| 1,762,175 | Huenlich | June 10, 1930 |
| 1,822,932 | Loughridge | Sept. 15, 1931 |
| 1,992,893 | Thomas | Feb. 26, 1935 |
| 2,102,316 | Guedon | Dec. 14, 1937 |
| 2,113,401 | Goldsmith | Apr. 5, 1938 |
| 2,181,437 | Norton | Nov. 28, 1939 |
| 2,193,443 | Bender | Mar. 12, 1940 |
| 2,267,693 | Di Toro | Dec. 23, 1941 |
| 2,318,308 | Harris | May 4, 1943 |
| 2,479,894 | Andrews | Aug. 23, 1949 |